United States Patent [19]

Sonnek

[11] Patent Number: 5,392,501
[45] Date of Patent: Feb. 28, 1995

[54] AUTOMATIC LATHE

[75] Inventor: Werner Sonnek, Lichtenwald, Germany

[73] Assignee: Traub Aktiengesellschaft, Germany

[21] Appl. No.: 118,115

[22] Filed: Sep. 7, 1993

[30] Foreign Application Priority Data

May 11, 1993 [DE] Germany .................... 9307155

[51] Int. Cl.⁶ ..................... B23B 7/04; B23B 9/04
[52] U.S. Cl. ........................ 29/27 C; 29/36; 82/120; 82/124; 82/129; 82/138
[58] Field of Search ............ 82/120, 121, 124, 125, 82/129, 138; 29/27 R, 27 C, 36

[56] References Cited

U.S. PATENT DOCUMENTS

| | | | |
|---|---|---|---|
| 3,821,833 | 7/1974 | St. Andre et al. | 82/125 |
| 3,990,133 | 11/1976 | Schalles et al. | 82/124 |
| 4,064,774 | 12/1977 | Maddock | 82/124 |
| 4,612,832 | 9/1986 | Ushigoe et al. | 82/129 |
| 5,031,490 | 7/1991 | Grossmann | 82/124 |
| 5,054,176 | 10/1991 | Wachter | 29/40 |
| 5,105,694 | 4/1992 | Smith et al. | 82/138 |
| 5,117,544 | 6/1992 | Kousaku et al. | 29/27 C |
| 5,127,140 | 7/1992 | Oiwa et al. | 29/27 C |
| 5,152,201 | 10/1992 | Izawa | 82/129 |

FOREIGN PATENT DOCUMENTS 8313200 9/1983 Germany .................... B23B 7/C4
1373152 11/1974 United Kingdom .................... 82/129

Primary Examiner—William E. Terrell
Attorney, Agent, or Firm—Webb Ziesenheim Bruening Logsdon Orkin & Hanson

[57] ABSTRACT

In an automatic lathe, a rotatable turret head is supported on a cross slide arrangement for longitudinal and transverse movements with respect to a headstock spindle. At least one counter spindle, associated with the headstock spindle, clamps a workpiece to be severed from the workpiece rod material. The counter spindle and at least one tool holder are arranged on the turret head whereby either the Counter spindle or the tool holder can be moved selectively into alignment with the headstock spindle by the rotation of the turret head. Additional tool holders, disposed spaced and parallel to each other on an additional tool carrier, can be moved selectively into alignment with the counter spindle. At least one turret head tool holder is a multiple tool holder with a plurality of tool clamping devices arranged spaced and parallel to each other. In one turret head position, one tool clamping device is opposite the headstock spindle and the counter spindle is opposite one of the additional tool holders. In a second turret head position, another tool clamping device is opposite the headstock spindle and the counter spindle is opposite another of the additional tool holders.

18 Claims, 6 Drawing Sheets

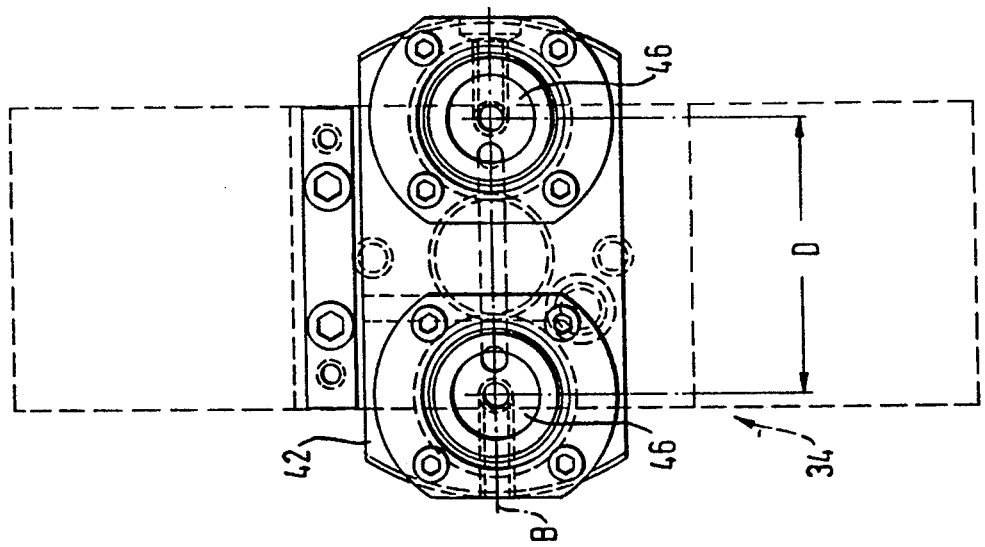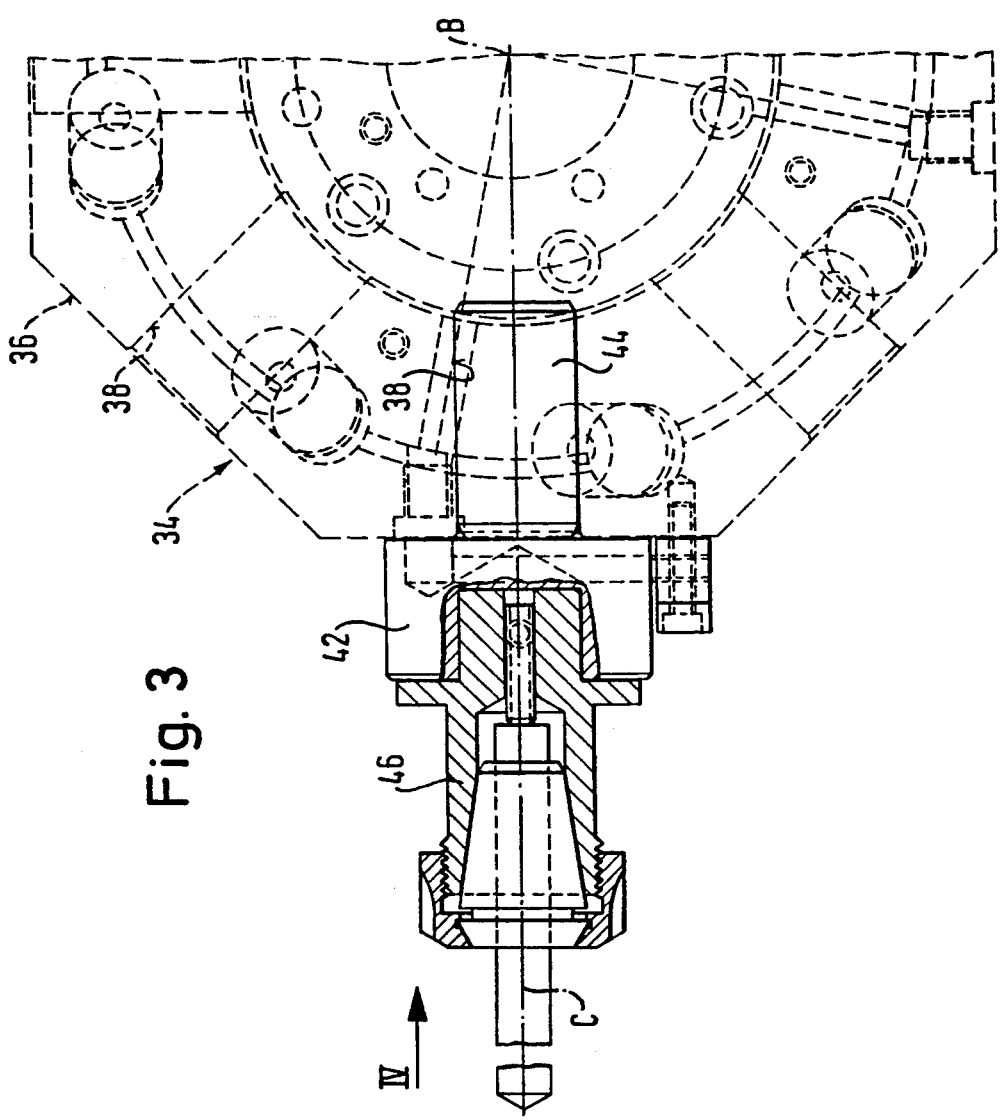

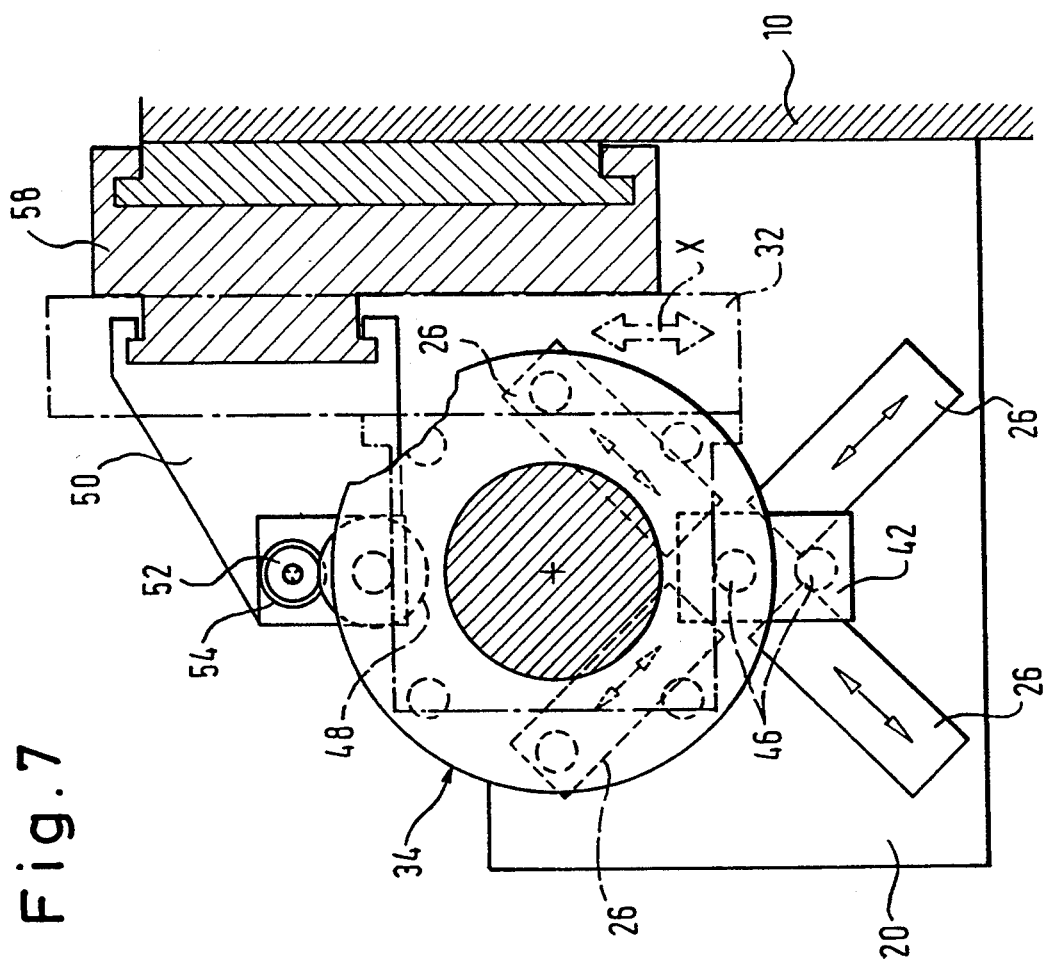

AUTOMATIC LATHE

BACKGROUND OF THE INVENTION

The instant invention relates to an automatic lathe, comprising
- a headstock spindle adapted to clamp workpiece rod material,
- a turret head supported on a cross slide arrangement for longitudinal and transverse movements with respect to the headstock spindle and for rotation with respect to a turret axis,
- at least one counter spindle adapted to clamp a workpiece to be severed from the workpiece rod material and subsequently to be processed further,
- a plurality of tool holders to hold tools for machining a workpiece still connected to the workpiece rod material,
- the counter spindle and at least one of the tool holders being arranged on the turret head in such a manner that either the counter spindle or this tool holder can be moved selectively into a position of alignment with the headstock spindle, by rotation of the turret head, and
- an additional tool carrier on which a plurality of additional tool holders are disposed parallel to each other at a spacing and adapted to be moved selectively into alignment with the counter spindle when the latter is in a position remote from the headstock spindle.

BACKGROUND OF THE INVENTION

A known turning machine of this kind (DE 83 13 200 U1) comprises a star turret as its first turret head. On its outside surface, this star turret includes eight chucking or clamping faces, for instance, of which seven are taken by a tool holder each, while a counter spindle adapted to be driven in rotation is mounted on the eighth. Towards the end of its machining work on a workpiece clamped in the headstock spindle, this turret head adopts a position at which the counter spindle aligns with the headstock spindle and grasps the workpiece by its free end, while a parting or severing tool mounted on a second revolving tool holder cuts the workpiece off the workpiece rod material. Thereupon the first turret is pivoted through 180° so that the counter spindle including the severed workpiece becomes positioned opposite an additional tool holder which may be embodied by a drum turret. The latter comprises a plurality of tools arranged in parallel and equally spaced from one another to carry out a number of additional machining steps on the newly exposed rear surface of the workpiece clamped in the counter spindle and rotating together with it. At the same time, a tool mounted on the first turret, diametrically opposite the counter spindle, machines the front end of the next workpiece while still connected to the workpiece rod material. The first turret head must not be shifted further until treatment has been completed on the workpiece which is clamped in the counter spindle. This causes a delay in processing of the front end of the next workpiece still linked to the workpiece rod material, at least in the event that this processing requires the action of another tool disposed on the first turret head.

SUMMARY OF THE INVENTION

It is the object of the instant invention to further increase the processing capacity of an automatic lathe which comprises a counter spindle mounted on a turret head.

Starting from a turning machine as defined initially, this object is met, in accordance with the invention, in that
- at least one tool holder mounted on the turret head is a multiple tool holder at which a plurality of tool clamping means are arranged parallel to each other at a spacing which corresponds to the spacing between the tool holders on the additional tool carrier, and
- the turret head is movable, by transverse movement of the cross slide arrangement, from a first position in which a first one of these tool clamping means is located opposite the headstock spindle, and the counter spindle, simultaneously, is located opposite a first one of the tool holders disposed on the additional tool carrier, into a second position in which a second one of the tool clamping means disposed on the multiple tool holder is located opposite the headstock spindle, and the counter spindle, simultaneously, is located opposite the second tool holder mounted on the additional tool carrier.

The multiple tool holder according to the invention can be secured to the turret head instead of any conventional tool holder. It may be designed, for instance, as a twin tool holder including two tool clamping devices or as a triple tool holder with three tool clamping devices. However, it may also comprise a greater number of tool clamping means for special cases. The tool clamping means, each chucking a tool, may be used to act successively on a workpiece which still is connected to the workpiece rod material, while at the same time a workpiece previously severed from the workpiece rod material and held by the counter spindle is being machined successively by tools which are chucked in one each of the tool holders provided on the additional tool carrier. The additional tool carrier may be of simple structure since the tool holders it supports have to be movable, in general, only in longitudinal direction of the headstock spindle rather than also transversely thereof. This has the further advantage of little space requirement for the additional tool carrier.

Further developments of the invention are presented in the subsidiary claims.

BRIEF DESCRIPTION OF THE DRAWINGS

An embodiment of the invention will be described in greater detail below, with reference to diagrammatic drawings, in which:

FIG. 3 is another enlarged detail of FIG. 2, as seen in the direction of arrow III and partly shown in vertical section;

FIG. 4 shows the view in the direction of arrow IV in FIG. 3;

FIG. 7 is a sectional view of the modified lathe shown in FIG. 6 taken along line VII—VII.

DESCRIPTION OF THE PREFERRED EMBODIMENT

Figure 1:
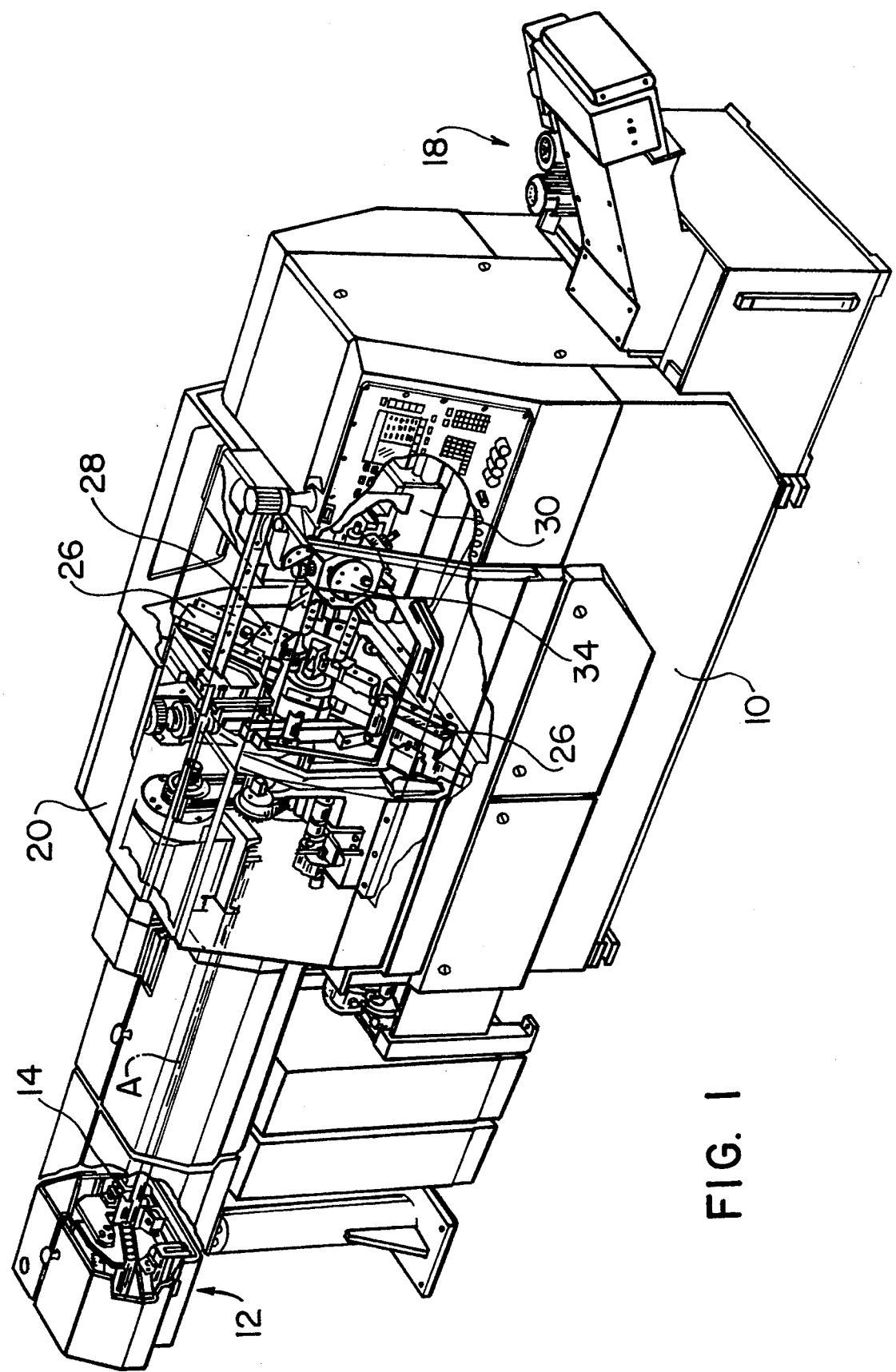
FIG. 1 is an oblique elevational view of an automatic lathe according to the invention.

The automatic lathe shown comprises a bench or bed 10 to the left end of which, in FIG. 1, a rod loading magazine 12 is attached to feed workpiece rod material 14 which will be processed to workpieces 16. A chip conveyor 18 is attached to the right end of the bed 10, in FIG. 1. On the bed 10, a headstock 20 is mounted which supports a headstock spindle 22 such that the axis A thereof extends horizontally. A chuck 24 is fastened to the right end of the headstock spindle 22, as seen in FIG. 1. A total of four slides 26 around the chuck 24 are guided on the head stock 20 for radial displacement with respect to the headstock spindle axis A, each slide carrying a respective tool holder 28.

A saddle 30 is movable on the bed 10 in parallel with the headstock spindle axis A. In accordance with customary designation, the direction of movement of the saddle 30 is referred to as Z-axis and marked by double arrow Z in FIG. 1. A cross slide 32 is movable on the saddle 30 at right angles to the Z-axis and thus also to the headstock spindle axis A, the direction of movement of this slide, usually referred to as X-axis, is marked by double arrow X in FIG. 1. The cross slide 32 supports a turret head 34, embodied by a star turret in the embodiment illustrated, which is mounted for stepwise rotation about a turret axis B in parallel with the X-axis.

The turret head 34 includes eight planar clamping faces 36 around its outer peripheral surface or shell, each being provided in the middle with a holding bore 38 which extends radially with respect to the turret axis B. In the embodiment illustrated, six of the eight clamping faces 36 are occupied by a simple tool holder 40 each, while a seventh one supports a multiple tool holder 42, embodied by the twin tool holder in this example. Each of the single tool holders 40 and the twin tool holder 42 have a shaft 44 of standardized dimensions by which they are securely held in the corresponding bores 38.

The eighth clamping face 36 of the turret head 34 is occupied by a counter spindle 48 which likewise is fixed in its corresponding bore 38 by a shaft formed on the counter spindle and having the same outer dimensions as the other shafts 44. The counter spindle 48 is adapted to be driven in rotation in conventional manner. Its axis of rotation, referred to below as the counter spindle axis C, intersects the turret axis B at right angles and defines a plane of symmetry which is vertical to the turret axis B. The two tool clamping means 46 of the multiple tool holder 42 are disposed symmetrically with respect to this plane of symmetry and parallel to each other at a spacing D from each other.

An additional tool carrier 50 supporting two additional tool holders 52 is disposed beyond the turret head 34, as seen from the headstock spindle 22. These tool holders each are mounted at the left end, in FIG. 1, of a corresponding main spindle 54. The two main spindles 54 each are supported in the additional tool carrier 50 for rotation about a respective spindle axis E extending parallel to the Z-axis and can be driven by a common motor via a transmission 56. Like tail spindles, the main spindles 54 may be separately movable in the direction of the Z-axis. In the embodiment shown, however, the additional tool carrier 50 as a whole, including the main spindles 54, is displaceable in Z direction on a support 58. In any case, the main spindles 54 are positioned at a spacing D from each other which corresponds to spacing D between the two workpiece clamping means 46 of the multiple tool holder 42. The support 58 is fixed on the saddle 30 so as to accompany the movements thereof in Z direction.

Figure 2:
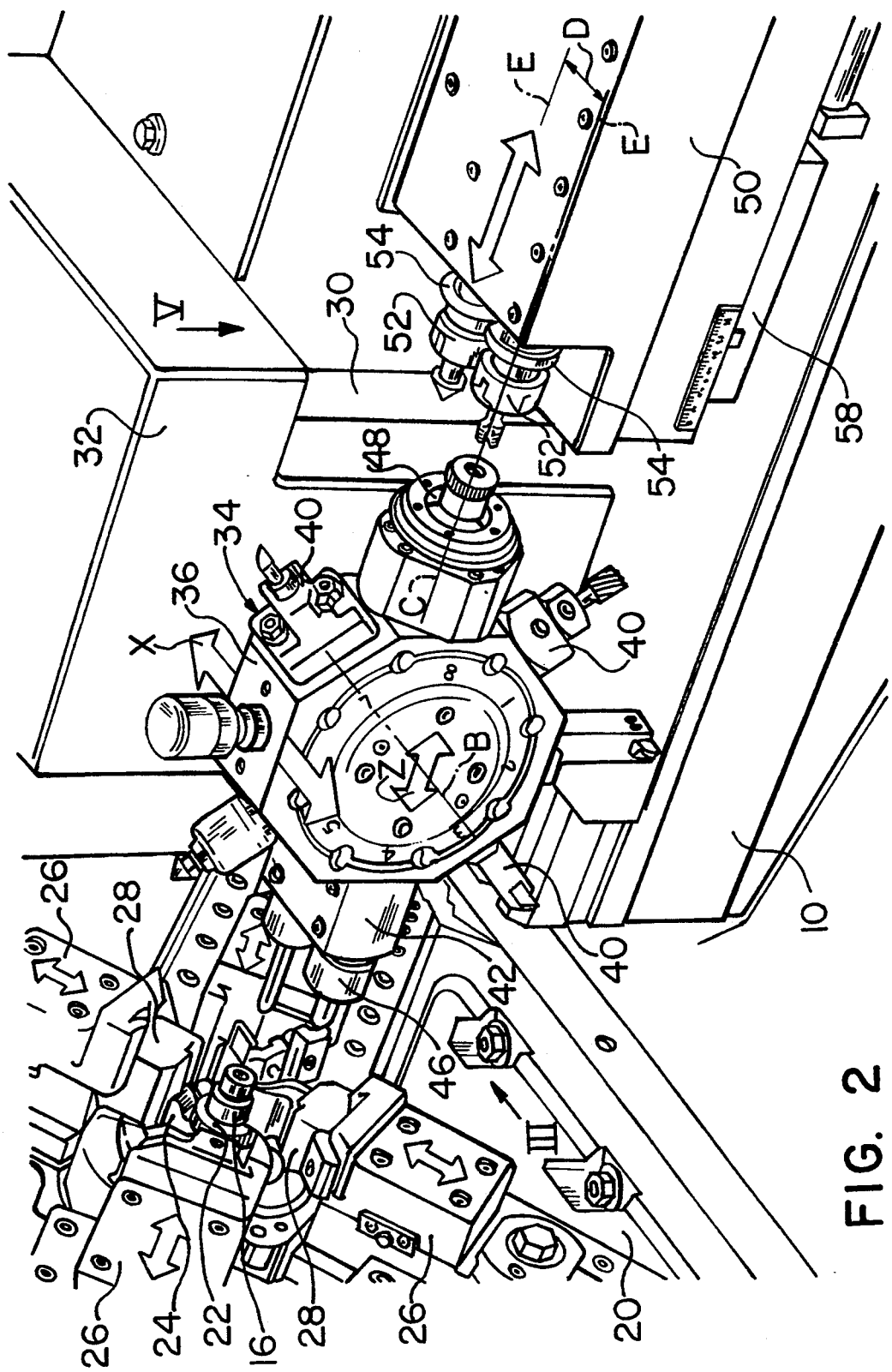
FIG. 2 shows an enlarged detail of FIG. 1.
Figure 5:
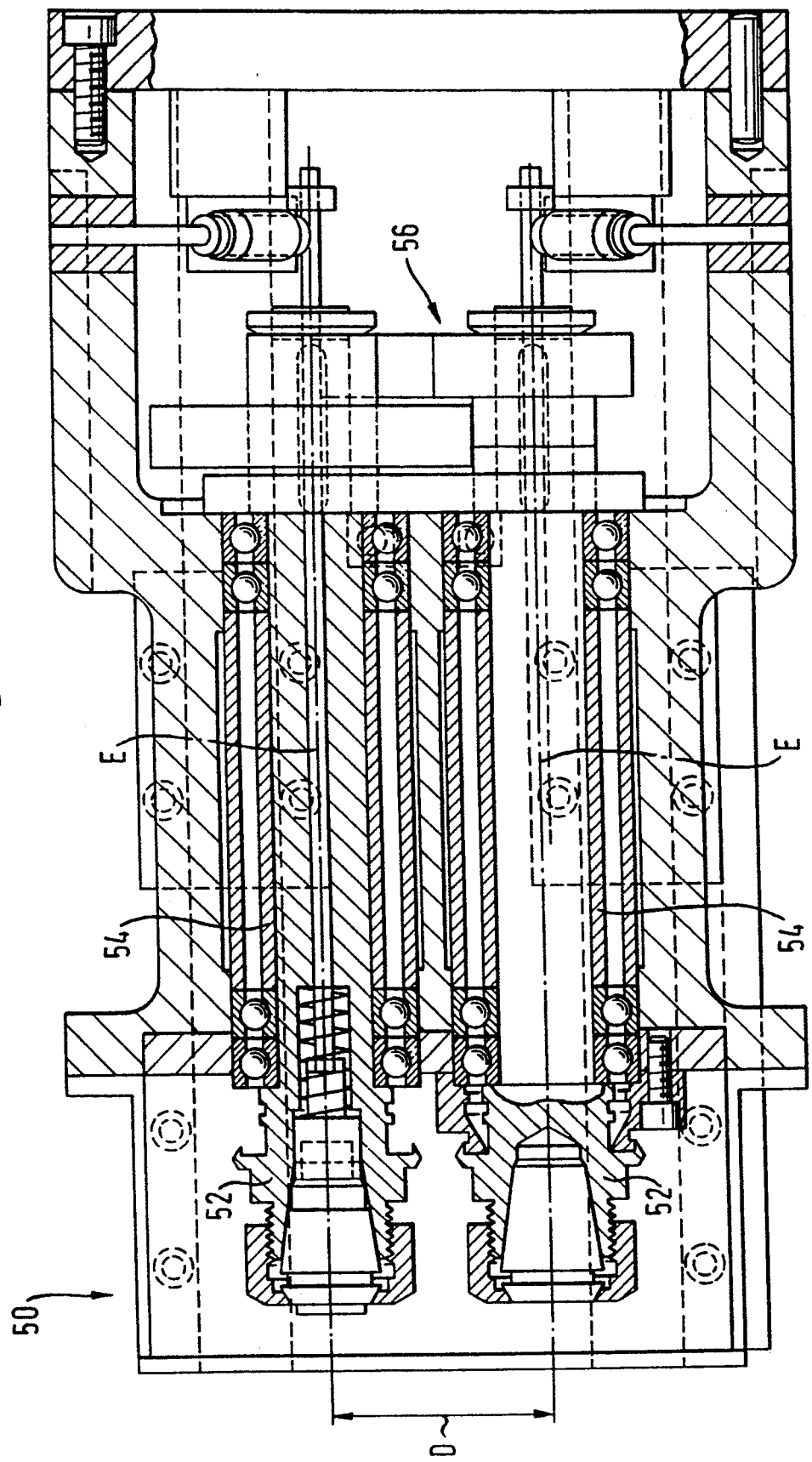
FIG. 5 is another enlarged detail of FIG. 2, as seen in the direction of arrow V and partly shown in horizontal section.

In the position adopted by the turret head 34 according to FIGS. 1 and 2, the multiple tool holder 42 is located opposite the chuck 24 in such a way that the axis of the tool clamping means 46 which is further away from the observer is aligned with the headstock spindle axis A. In this position, a workpiece 16 being made at the end of the workpiece rod material 14 can be formed with a central bore, for instance. At this time, the counter spindle 48 adopts the position likewise to be seen in FIGS. 1 and 2, a position at which the counter spindle axis C is aligned with spindle axis E of the main spindle 54 which is closer to the observer. In this position, a tool, such as a thread cutter clamped in the corresponding tool clamping means 46 can carry out central machining on the workpiece 16 clamped in the counter spindle 48.

Movement of the cross slide 32 in X direction, away from the observer of FIGS. 1 and 2, by a distance which is the same as the spacing D already mentioned, will bring the second tool clamping means 46 provided at the multiple tool holder 42 into a position of alignment with the headstock spindle axis A. Thus a tool clamped in this tool clamping means 46 can be used to effect further centric processing of the workpiece 16 which as yet is connected to the workpiece rod material 14. As the cross slide 32 is moved in X direction away from the observer, the counter spindle gets into a position in which its axis C will be aligned with the spindle axis E of the main spindle 54 farther away from the observer on the additional tool carrier 50. Consequently, also the workpiece 16 held in clamping engagement by the counter spindle 48 can be subjected to a second round of central machining.

The additional tool holders 52 need not necessarily be mounted on a main spindle 54 of their own. They also can be fixed on the additional tool carrier 50, provided the rotational drive facility of the counter spindle 48 is sufficient for the machining work to be done on the workpiece 16 held by the counter spindle. The same applies to the workpiece clamping means 46 provided at the multiple tool holder 42. Again, it is only preferred that they should be adapted to be driven in rotation. They may be replaced by rigid tool clamping means 46, such as lathe tool holders.

Figure 6:
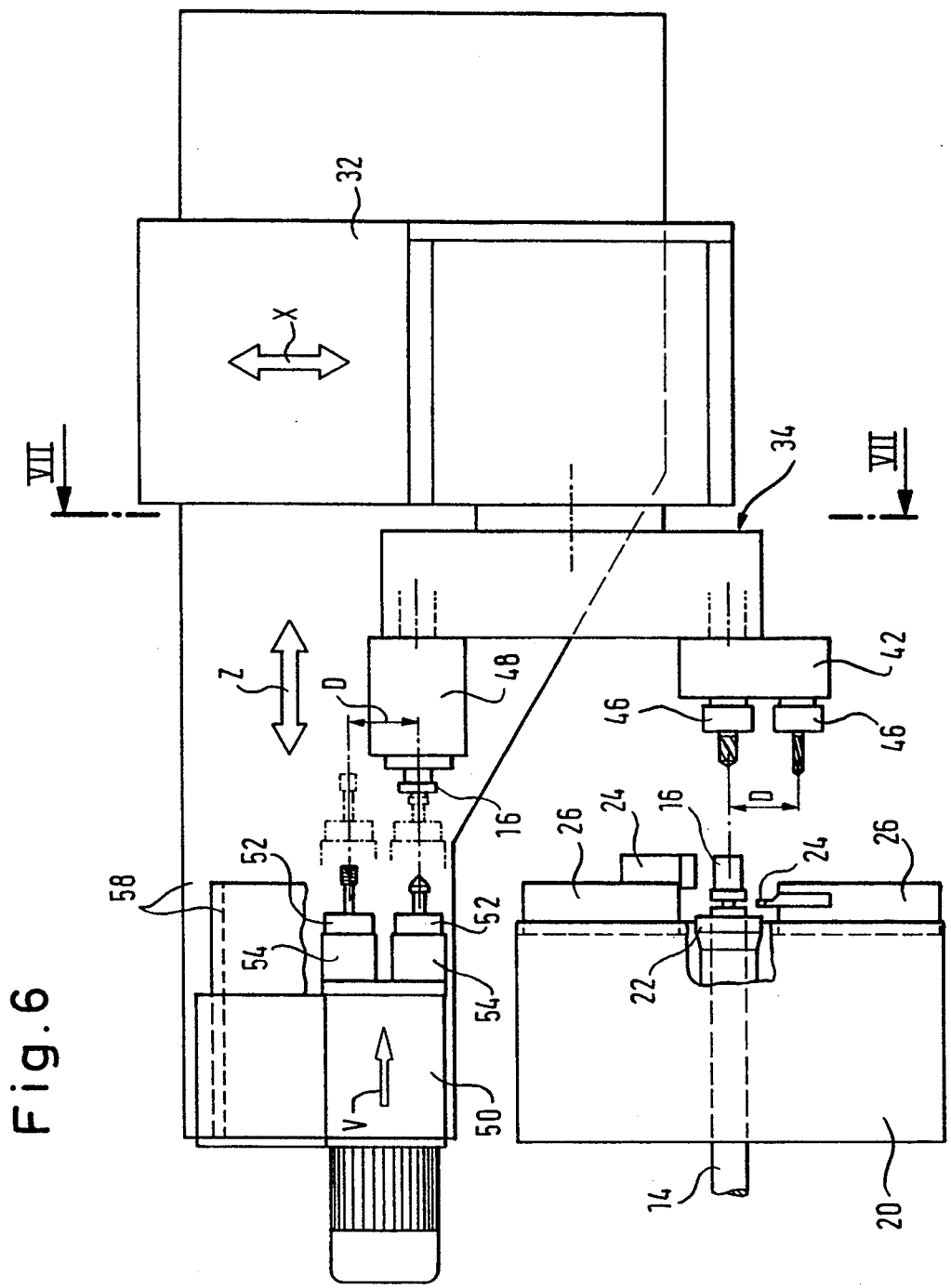
FIG. 6 is an elevational view of a modified automatic lathe according to the present invention.

In another embodiment of the invention, shown in FIGS. 6 and 7, the turret head 34 is a drum turret having its turret axis B extend parallel to the headstock spindle axis A. In this case, preferably, the tool holders 40 and the tool clamping means 46 as well as the counter spindle 48 likewise are oriented in parallel with the headstock spindle axis A. The additional tool carrier 50, including the tool holders 52 which are responsible for machining the rear of the workpieces 16, preferably is arranged on the headstock 20 spaced from and parallel to the headstock spindle.

In another modification, the turret head 34 is a crown turret having a conical or pyramidal outer surface and including tool holders which are obliquely oriented in respect of the turret axis.

In any case, a multiple tool holder of the type according to the invention mounted on the turret head 34 allows more economic use to be made of productive machining time.

What is claimed is:

1. An automatic lathe, comprising
   a headstock spindle adapted to clamp workpiece rod material,
   a turret head supported on a cross slide arrangement for longitudinal and transverse movements with respect to the headstock spindle and for rotation with respect to a turret axis,
   at least one counter spindle adapted to clamp a workpiece to be severed from the workpiece rod material and subsequently to be processed further,
   a plurality of tool holders to hold tools for machining a workpiece still connected to the workpiece rod material,
   the counter spindle and at least one of the tool holders being arranged on the turret head in such a manner that either the counter spindle or the tool holder can be moved selectively into a position of alignment with the headstock spindle by rotation of the turret head, and
   an additional tool carrier on which a plurality of additional tool holders are disposed parallel to each other at a spacing and adapted to be moved selectively into alignment with the counter spindle when the latter is in a position remote from the headstock spindle, wherein
   at least one tool holder mounted on the turret head is a multiple told holder at which a plurality of tool clamping means are arranged parallel to each other at a spacing which corresponds to the spacing between the tool holders on the additional tool carrier, and
   the turret head is movable, by transverse movement of the cross slide arrangement, from a first position in which a first one of these tool clamping means is located opposite the headstock spindle, and the counter spindle, simultaneously, is located opposite a first one of the tool holders disposed on the additional tool carrier, into a second position in which a second one of the tool clamping means disposed on the multiple tool holder is located opposite the headstock spindle and the counter spindle, simultaneously, is located opposite a second one of the tool holders mounted on the additional tool carrier.

2. The lathe as claimed in claim 1, wherein the tool clamping means of the multiple tool holder are adapted to be driven in rotation.

3. The lathe as claimed in claim 1, wherein the multiple tool holder is disposed diametrically opposite the counter spindle, with respect to the turret axis.

4. The lathe as claimed in claim 3, wherein
   the turret head is a star turret and the tool clamping means of the multiple tool holder as well as the counter spindle extend radially away from the turret axis,
   the additional tool carrier is mounted on a support which is connected for joint longitudinal movement to the cross slide arrangement supporting the turret head, and
   the tool holders are movable on the additional tool carrier in longitudinal direction with respect to the support.

5. The lathe as claimed in claim 4, wherein the additional tool holder, as a whole, is movable longitudinally with respect to the support.

6. The lathe as claimed in claim 1, wherein
   the turret head is a drum turret at which the tool clamping means and the counter spindle are arranged in parallel with the turret axis, and
   the additional tool carrier is guided at a headstock which supports the headstock spindle.

7. The lathe as claimed in claim 1 wherein
   the multiple tool holder comprises a shaft for attachment at the turret head, and
   the tool clamping means of the multiple tool holder are disposed symmetrically with respect to the shaft.

8. The lathe as claimed in claim 2, wherein the multiple tool holder is disposed diametrically opposite the counter spindle, with respect to the turret axis.

9. The lathe as claimed in claim 8, wherein the turret head is a star turret and the tool clamping means of the multiple tool holder as well as the counter spindle extend radially away from the turret axis, the additional tool carrier is mounted on a support which is connected for joint longitudinal movement to the cross slide arrangement supporting the turret head, and the tool holders are movable on the additional tool carrier in longitudinal direction with respect to the support.

10. The lathe as claimed in claim 9, wherein the additional tool holder, as a whole, is movable longitudinally with respect to the support.

11. The lathe as claimed in claim 2, wherein the turret head is a drum turret at which the tool clamping means and the counter spindle are arranged in parallel with the turret axis, and the additional tool carrier is guided at a headstock which supports the headstock spindle.

12. The lathe as claimed in claim 3, wherein the turret head is a drum turret at which the tool clamping means and the counter spindle are arranged in parallel with the turret axis, and the additional tool carrier is guided at a headstock which supports the headstock spindle.

13. The lathe as claimed in claim 8, wherein the turret head is a drum turret at which the tool clamping means and the counter spindle are arranged in parallel with the turret axis, and the additional tool carrier is guided at a headstock which supports the headstock spindle.

14. The lathe as claimed in claim 2, wherein the multiple tool holder comprises a shaft for attachment at the turret head, and the tool clamping means of the multiple tool holder are disposed symmetrically with respect to the shaft.

15. The lathe as claimed in claim 3, wherein the multiple tool holder comprises a shaft for attachment at the turret head, and the tool clamping means of the multiple tool holder are disposed symmetrically with respect to the shaft.

16. The lathe as claimed in claim 4, wherein the multiple tool holder comprises a shaft for attachment at the turret head, and the tool clamping means of the multiple tool holder are disposed symmetrically with respect to the shaft.

17. The lathe as claimed in claim 5, wherein the multiple tool holder comprises a shaft for attachment at the turret head, and the tool clamping means of the multiple tool holder are disposed symmetrically with respect to the shaft.

18. The lathe as claimed in claim 6, wherein the multiple tool holder comprises a shaft for attachment at the turret head, and the tool clamping means of the multiple tool holder are disposed symmetrically with respect to the shaft.

* * * * *

UNITED STATES PATENT AND TRADEMARK OFFICE
CERTIFICATE OF CORRECTION

PATENT NO. : 5,392,501
DATED : February 28, 1995
INVENTOR : Werner Sonnek

It is certified that error appears in the above-indentified patent and that said Letters Patent is hereby corrected as shown below:

Abstract Line 8 "Counter" should read --counter--.

Claim 1 Line 28 Column 5 "told" should read --tool--.

Claim 7 Line 6 Column 6 after "1" insert --,--.

Signed and Sealed this

Sixteenth Day of May, 1995

Attest:

BRUCE LEHMAN

*Attesting Officer*  *Commissioner of Patents and Trademarks*